(12) United States Patent
Reznic et al.

(10) Patent No.: US 11,140,413 B2
(45) Date of Patent: Oct. 5, 2021

(54) VIDEO COMPRESSION SYSTEM

(71) Applicant: Amimon Ltd., Ra'anana (IL)

(72) Inventors: Zvi Reznic, Tel Aviv (IL); Amnon Cohen-Tidhar, Zoran (IL); Tal Keren-Zvi, Rosh-HaAin (IL)

(73) Assignee: AMIMON LTD., Ra'anana (IL)

( * ) Notice: Subject to any disclaimer, the term of this patent is extended or adjusted under 35 U.S.C. 154(b) by 0 days.

(21) Appl. No.: 16/633,163

(22) PCT Filed: Sep. 3, 2018

(86) PCT No.: PCT/IL2018/050973
§ 371 (c)(1),
(2) Date: Jan. 23, 2020

(87) PCT Pub. No.: WO2019/069301
PCT Pub. Date: Apr. 11, 2019

(65) Prior Publication Data
US 2021/0160537 A1    May 27, 2021

Related U.S. Application Data

(60) Provisional application No. 62/567,252, filed on Oct. 3, 2017.

(51) Int. Cl.
*H04N 19/58* (2014.01)
*H04N 19/105* (2014.01)
(Continued)

(52) U.S. Cl.
CPC ............... *H04N 19/58* (2014.11); *G06T 1/20* (2013.01); *H04N 19/105* (2014.11); *H04N 19/159* (2014.11); *H04N 19/172* (2014.11)

(58) Field of Classification Search
CPC .... H04N 19/58; H04N 19/105; H04N 19/159; H04N 19/172; G06T 1/20
See application file for complete search history.

(56) References Cited

U.S. PATENT DOCUMENTS

2007/0199011 A1* 8/2007 Zhang .................. H04N 19/124
725/1
2008/0103383 A1* 5/2008 van der Kouwe ... A61B 5/0037
600/410
(Continued)

OTHER PUBLICATIONS

International Search Report (ISR) in PCT/IL2018/050973, dated Jan. 2, 2019.
(Continued)

*Primary Examiner* — Anner N Holder
(74) *Attorney, Agent, or Firm* — Eitan Mehulal Sadot

(57) ABSTRACT

A method for long-term reference prediction video compression, includes: dividing a viewing area into a plurality of viewing sections; measuring an elevation and an azimuth of a field of view (fov) in one or more of the viewing sections; determining a storage location of a video frame associated with the field of view based on the measured elevation and azimuth. A long-term reference prediction video compression encoder, includes: a buffer for storing long-term video frames; a detector to measure an elevation and an azimuth of a field of view associated with a video frame; a buffer manager to determine, based on the measured elevation and azimuth, to store data associated with the video frame in the long-term frame buffer.

12 Claims, 6 Drawing Sheets

(51) Int. Cl.
*H04N 19/159* (2014.01)
*H04N 19/172* (2014.01)
*G06T 1/20* (2006.01)

(56) References Cited

U.S. PATENT DOCUMENTS

| | | |
|---|---|---|
| 2013/0003845 A1 | 1/2013 | Zhou |
| 2016/0198170 A1* | 7/2016 | Schlockermann ... H04N 19/127 375/240.16 |
| 2016/0360209 A1 | 12/2016 | Gosling |
| 2017/0085871 A1 | 3/2017 | Wang |
| 2018/0344290 A1* | 12/2018 | Veronesi .............. G06T 7/00 |
| 2019/0164330 A1* | 5/2019 | Sugano .............. G02B 27/0172 |
| 2019/0356894 A1* | 11/2019 | Oh .................. G06F 3/011 |
| 2020/0120326 A1* | 4/2020 | Deshpande ........ H04N 21/8456 |

OTHER PUBLICATIONS

Written Opinion of the International Searching Authority in PCT/IL2018/050973, dated Jan. 2, 2019.
Ozbek et al., "H.264 Encoding of Videos With Large Number of Shot Transitions Using Long-Term Reference Pictures", 14th European Signal Processing Conference (EUSIPCO 2006), Florence, Italy, Sep. 4-8, 2006.

* cited by examiner

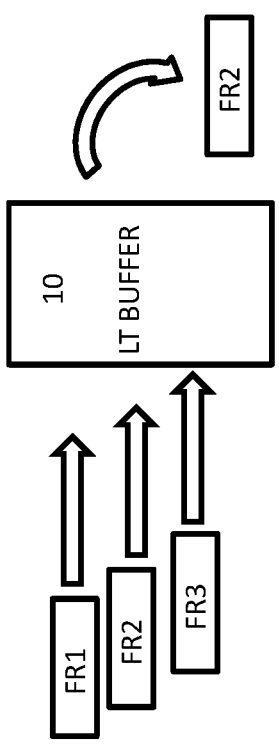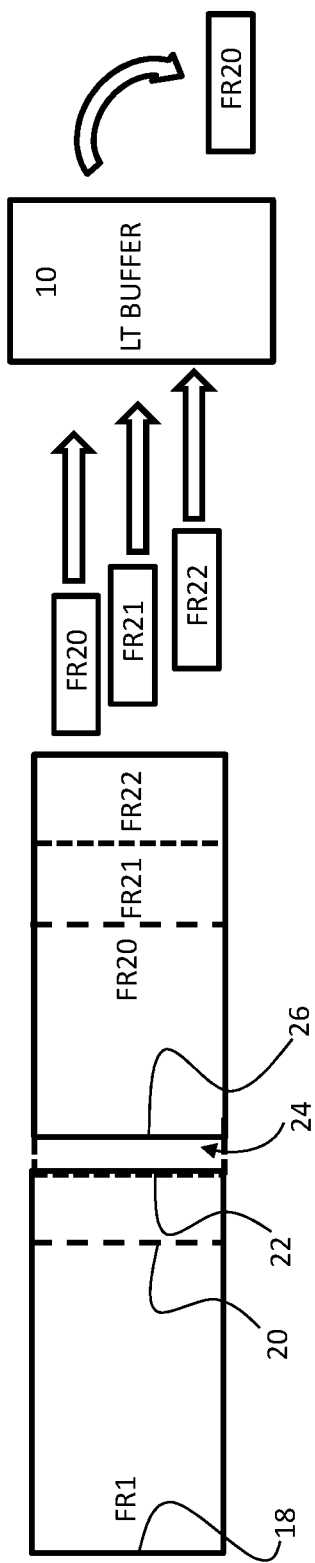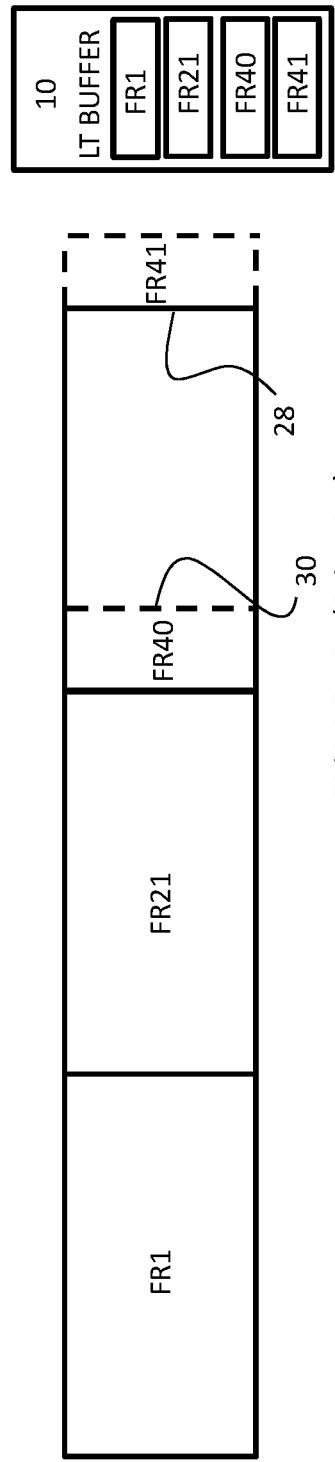
FIGURE 1A (Prior Art)
FIGURE 1B (Prior Art)
FIGURE 1C (Prior Art)

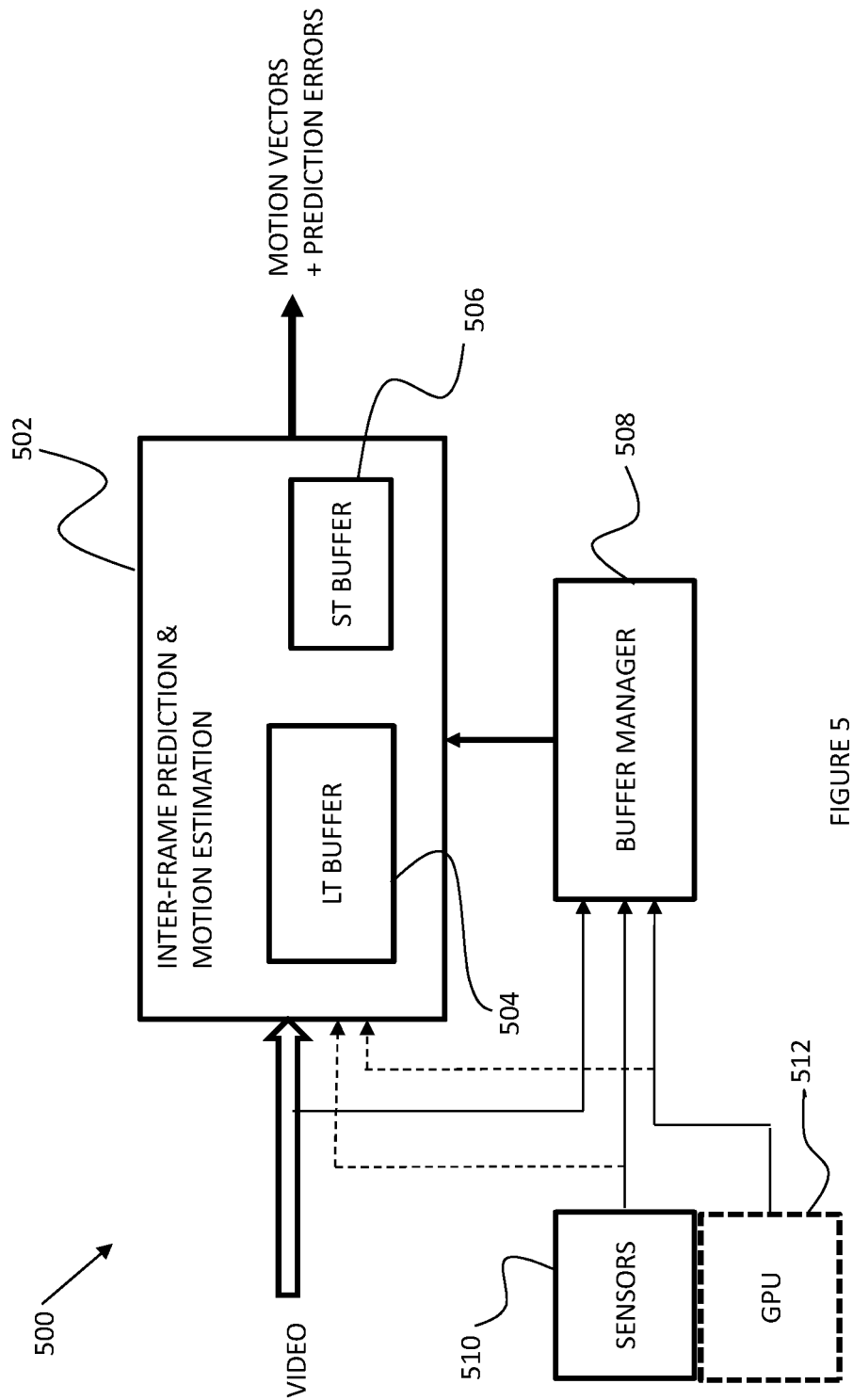

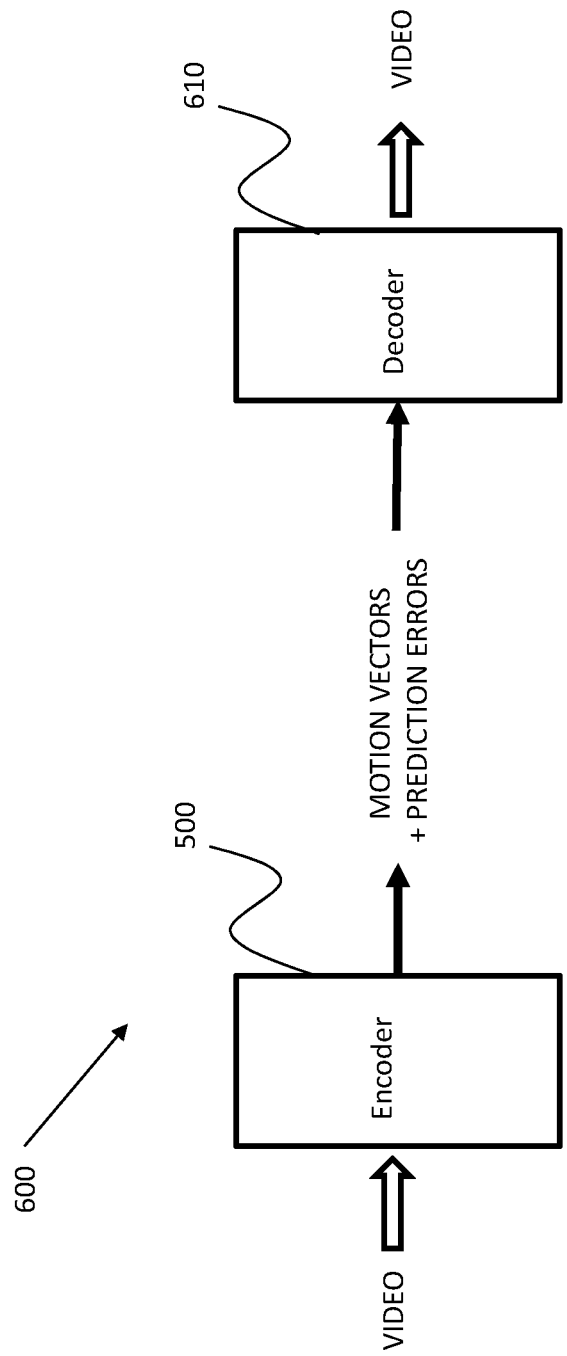

VIDEO COMPRESSION SYSTEM

CROSS-REFERENCE TO RELATED APPLICATIONS

This application is a National Stage of PCT international patent application number PCT/IL2018/050973, having an international filing date of Sep. 3, 2018, published as international publication number WO 2019/069301 A1, which is hereby incorporated by reference in its entirety; which claims priority and benefit from U.S. provisional patent application No. 62/567,252, filed on Oct. 3, 2017, which is hereby incorporated by reference in its entirety.

FIELD

The present invention relates to video compression generally, and to a system and method for video compression using long-term prediction.

BACKGROUND

Video data may be represented as a series of still image frames. An encoder may encode the frames by storing the differences between the frames together with instructions describing the similarities between the frames. The instructions may include information associated with the differences in position of similar data between the frames which are generally due to motion. This difference is generally expressed by a motion vector and a prediction error. The encoded frames and/or the instructions are then sent by the encoder to a decoder where they may be decoded and the image frames reconstructed.

The encoded frames may be divided into three types of frames, I-frame, B-frame, and P-frame. The I-frame is generally referred as an intra-coded frame (intra-frame) and is coded without reference to other frames. The P-frame is generally referred to as a predicted inter-coded frame (inter-frame) and is encoded with respect to past I-frames and P-frames. The B-frame is generally referred to as a bidirectional predicted inter-frame and is encoded with respect to past and future I-frames and P-frames.

Common practice is to encode the video frames using known video compression formats associated with recognized video compression standards of which one of the most popular is the ITU's H.264 standard. In H.264, the encoder assumes that the decoder can store a certain number N of previous decoded frames in the decoder's buffer. These N previous decoded frames are then used as reference frames for inter-frame prediction. Following a certain period of time or based on other predetermined criteria, the decoder may replace the buffer content with another set of N frames, which may be the last set of N frames.

It should be noted that although the encoder has access to the original uncompressed and un-distorted frames, it would typically hold a copy of the frames as decoded by the decoder (the decoded frames). When the decoder holds N previously decoded frames, then typically the encoder would hold the same N previously decoded frames (as opposed to holding N original frames)

In H.264 the encoder may optionally allocate a portion of the decoder's buffer for long term storage of reference decoded frames to be used for long term prediction. This portion of buffer is frequently referred to as "long term (LT) buffer". These LT decoded frames may remain in the decoder's LT buffer until the encoder sends instructions to remove and/or replace them, while the other frames in the remaining portion of the buffer, or "short term (ST) buffer", are continuously being replaced. FIGS. 1A to 1C schematically illustrate an exemplary reference frame storage operation of video data in a LT buffer in a typical H.264 encoder for use in long term predictions.

Shown in FIG. 1A is the initial stage of the video encoding including the first three frames, a first frame FR1 which is designated by a solid-edge rectangle with side 12, a second frame FR2 which is designated by a first hatched-edge rectangle with side 14, and a third frame FR3 which is designated by a second hatched-edge rectangle with side 16. FR1, FR2 and FR3 come one after the other in the time domain. Furthermore, the frames may be associated with a changing field of view (FOV) as a result of camera movement (panning) or, in virtual reality (VR) applications, as a result of a player wearing VR glasses rotating his or her head. FR1 is the first frame to be encoded and all the video data contained therein is new, therefore the encoder sends instruction that the decoded version of FR1 be stored in the decoder's LT buffer 10. FR2 is encoded after FR2 and, although some of the data is similar to that in FR1 (shown by the overlap), the frame also contains new data and therefore the decoded version of FR2 is also stored in LT buffer 10. FR3 is encoded after FR1 and FR2 and overlaps with FR1 and FR2 but includes additional new data (not included in the previous frames), and therefore its decoded version is stored in LT buffer 10. Nevertheless, as the data included in FR1 and FR3 cover all the data in FR2, the decoded version of FR2 may be removed from LT buffer 10 to allow space for new reference frames with new data.

For simplicity, in the remaining text of this disclosure we shall use the term "frame" both for the original frame and for the decoded version of the frame.

Shown in FIG. 1B is a later stage of the video encoding including LT storage of reference frames, and includes four reference frames: frame FR1 which remains as a reference frame in LT buffer 10, a twentieth frame FR20 which is designated by the first hatched-edge rectangle with side 20, a twenty first frame FR21 which is designated by the second hatched-edge rectangle with side 21, and a twenty second frame FR22 also designated by the solid-edge rectangle with side 26. When FR20 is encoded, the frame overlaps with FR1 but includes new data so FR20 is stored in LT buffer 10. When FR21 is encoded, the frame overlaps with FR1 and FR20, but also includes new data so that FR21 is stored in LT buffer 10. FR20 is removed from LT buffer 10 as all its data is included in FR1 and FR21. When FR22 is encoded, the frame overlaps FR20 and FR21 but there is a gap 24 between the frame and FR1. FR22 includes additional new data so that the frame is stored in the LT buffer 10. FR21 is not removed because it is the only frame in the LT frame buffer that includes data which describes the gap 24.

Shown in FIG. 1C is an even later stage of the video encoding including LT storage of the reference frames, and includes four reference frames: frames FR1 and FR21 which remain as reference frames in LT buffer 10, a fortieth frame FR40 which is designated by the third solid-edge rectangle with side 28 and a forty first frame FR41 designated by the hatched-edge rectangle with side 30. Frame F40 does not overlap with any of the prior reference frames (FR1 and FR21) so the whole frame includes new data and is stored in LT buffer 10. When FR41 is encoded, the frame overlaps with FR40 but also includes new data so that FR41 is also stored in LT buffer 10.

SUMMARY

There is provided, in accordance with an embodiment of the present invention, a long-term reference prediction video compression method. The method may include dividing a viewing area into a plurality of viewing sections; measuring an elevation and an azimuth of a field of view (fov) in one or more of the viewing sections; and determining a storage location of a video frame associated with the field of view based on the measured elevation and azimuth.

In some embodiments, the storage location includes one of a long-term buffer and a short-term buffer.

In some embodiments, the method may additionally include storing in the long-term buffer video frames associated with fov's substantially covering the largest possible part of the viewing area.

In some embodiments, the method may additionally include selecting a reference frame for inter-frame coding from one of the long-term buffer and the short-term buffer based on the azimuth and elevation of the field of view.

In some embodiments, the method may additionally include determining, based on information received from a GPU, to store the video frame in the long-term buffer.

There is provided, in accordance with an embodiment of the present invention, a long-term reference prediction video compression encoding system including a long-term frame buffer for storing video frames; a detector to measure an elevation and an azimuth of a field of view associated with a video frame; and a buffer manager to determine, based on the measured elevation and azimuth, to store data associated with the video frame in the long-term frame buffer.

In some embodiments, the system may include a short-term buffer for storing frames.

In some embodiments, the system may include a motion estimator to select a reference frame from one of the long-term buffer and the short-term buffer based on the azimuth and elevation of the field of view.

In some embodiments, the detector may include an accelerometer.

In some embodiments, the detector may include an image processor.

In some embodiments, the system may include a GPU to generate the video frames and additional information.

In some embodiments, the buffer manager may alternatively determine, based on the additional information received from the GPU, to store data associated with the frame in the long-term buffer.

In some embodiments, the additional information may include any one of azimuth, elevation, and scene elements.

There is provided, in accordance with an embodiment of the present invention, a long-term reference prediction video compression system including a buffer for storing long-term video frames; a GPU; and a buffer manager to determine, based on information received from the GPU, to store data associated with a video frame in the long-term buffer.

In some embodiments, the information may include any one of an elevation and an azimuth of a field of view associated with a video frame, and scene elements.

In some embodiments, the system may additionally include a buffer for storing short-term frames.

In some embodiments, the system may additionally include a motion estimator to select a reference frame from one of the long-term buffer and the short-term buffer based on the azimuth and elevation of the field of view.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A to 1C schematically illustrate an exemplary reference frame storage operation of video data in a LT buffer in a typical H.264 encoder for use in long term predictions;

FIG. 5 schematically illustrates an encoder which may use long term prediction to encode 3D video, according to an embodiment of the present invention; and FIG. 6 schematically illustrates an exemplary video compression system using long term inter-frame prediction for 3D video, according to an embodiment of the present invention.

Figure 2:
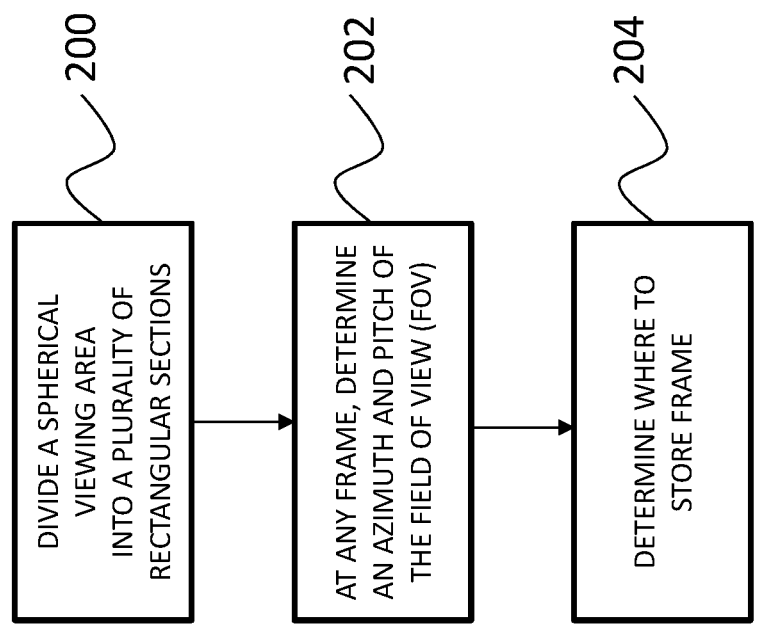
FIG. 2 is a flow chart of an exemplary method of reducing bit rate in encoding of 3D video scenes using long term reference prediction, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the Background section was described, with reference to FIGS. 1A-1C, an example of part of a video encoding operation associated with how the reference frames are stored in the LT buffer and made available for use in long term predictions. As may be appreciated from the example, FR1 and FR21 and subsequently other reference frames (from later stages of the encoding not shown in the example) will fill the LT buffer. In order to make space in the LT buffer, one or more frames, or possibly all the frames, must be removed. This requires the encoder processor to make a decision as to how many frames, and which frames, are to be removed to make room for new reference frames. This decision may be based on predetermined criteria which may include, for example, a complete change of scenery in which case the whole buffer may erased, or which set of frames offer maximum viewing area coverage and occupy minimum buffer space in which case those frames may remain while the rest are erased, among many other possible criteria.

In video compression, the goal is to reduce bit rate for a given quality. A key mechanism to reduce the bit rate is the use of inter-frame prediction using previous I-frames and P-frames as reference frames. A problem surges when encoding video related to three-dimensional (3D) scenes where an image acquisition device shifts its field of view from one area to another in the 3D scene. An example of such a situation may be when a virtual reality (VR) or Augmented Reality (AR) player wearing VR/AR goggles in a game turns his or her head to view another area of a scene. When the VR/AR player turns the head, a new area of the scene enters the VR/AR screen and inter-frame prediction cannot be used for encoding the new area to reduce the bit rate as there is a poor match between the new area in current frame and prior reference I and P frames. As a result, the new area of the screen has to be encoded without inter-frame prediction, and as a result the required bit rate for achieving a certain video quality, increases.

Applicant has realized that the problem of increased bit rate when encoding 3D scenes may be solved by defining each frame in a viewing area according to its azimuth and elevation relative to a spherical viewing area, and storing as reference frames in the LT buffer those frames which optimize coverage of the sphere with a given LT buffer size. These stored reference frames may then be used for inter-frame predictions, substantially eliminating the problem of encoding without inter-frame prediction (and increased bit rate) when there is a new area. Applicant has additionally realized that the azimuth and elevation information of the frames may be obtained using motion sensors and/or image processing.

Reference is made to FIG. 2 which is a flow chart of an exemplary method of reducing bit rate in encoding of 3D video scenes using long term reference prediction, according to an embodiment of the present invention.

At 202, a spherical viewing area may be divided into a plurality of rectangular sections (viewing areas).

Figure 3:
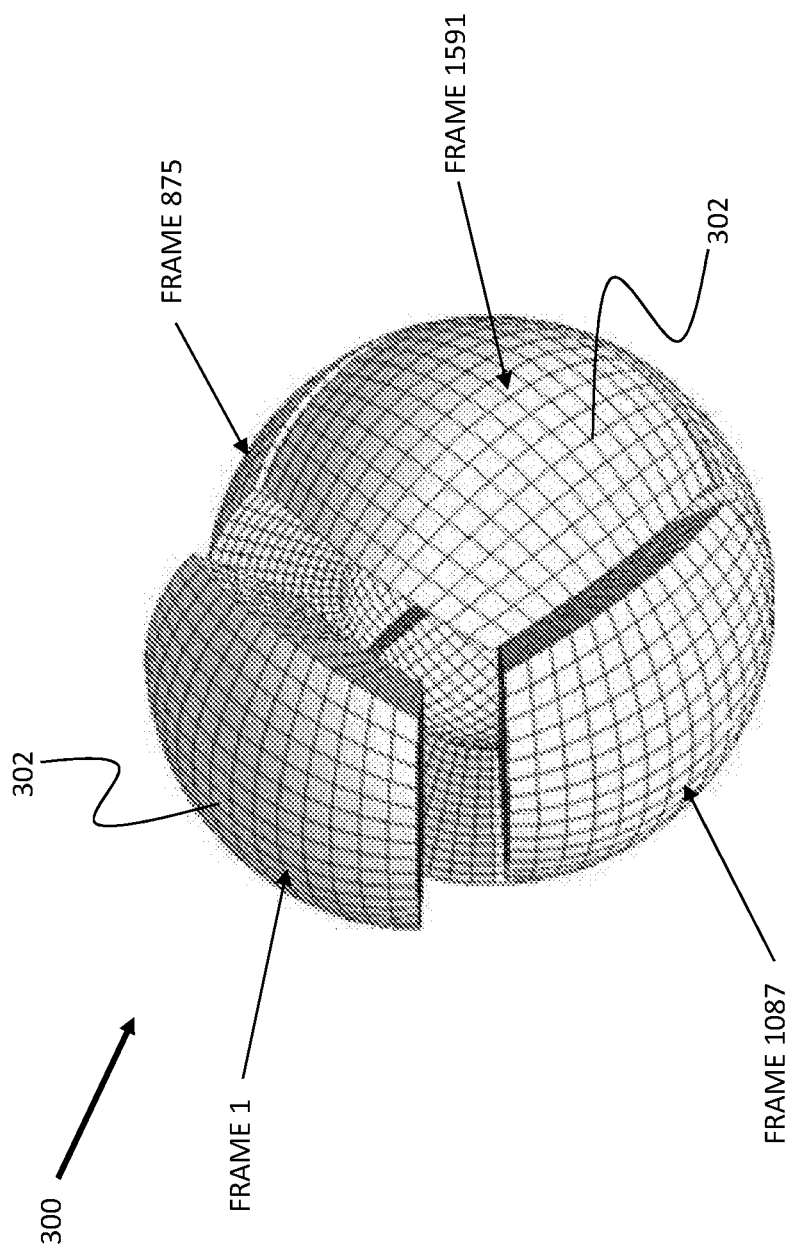
FIG. 3 is a representation of an exemplary spherical viewing area divided into exemplary rectangular sections, according to an embodiment of the present invention.

Each rectangular section may have the size of a field-of-view (FOV) of the image acquisition device which may be, for example, VR goggles. Shown in FIG. 3 is an exemplary spherical viewing area 300 divided into exemplary rectangular sections 302, according to an embodiment of the present invention. Six sections are shown in the figure, although the spherical viewing area may be divided into more or less sections, and not necessarily restricted to the FOV of the image acquisition device but may be based on other predetermined size criteria. The azimuth and elevation coordinates of the rectangular sections or viewing areas may be readily calculated based on their location on the spherical viewing area.

At 202, the azimuth and elevation coordinates of the FOV may be determined for any frame by using motion sensors and/or image processing.

At 204, the reference frames may be stored in a LT buffer and the non-reference frames in a ST buffer. Selection of the reference frames to be stored may be performed by a LT buffer manager which may decide, based on the azimuth and elevation coordinates of the FOV associated with a frame, which frames provide optimal coverage of the spherical viewing area.

Figure 4:
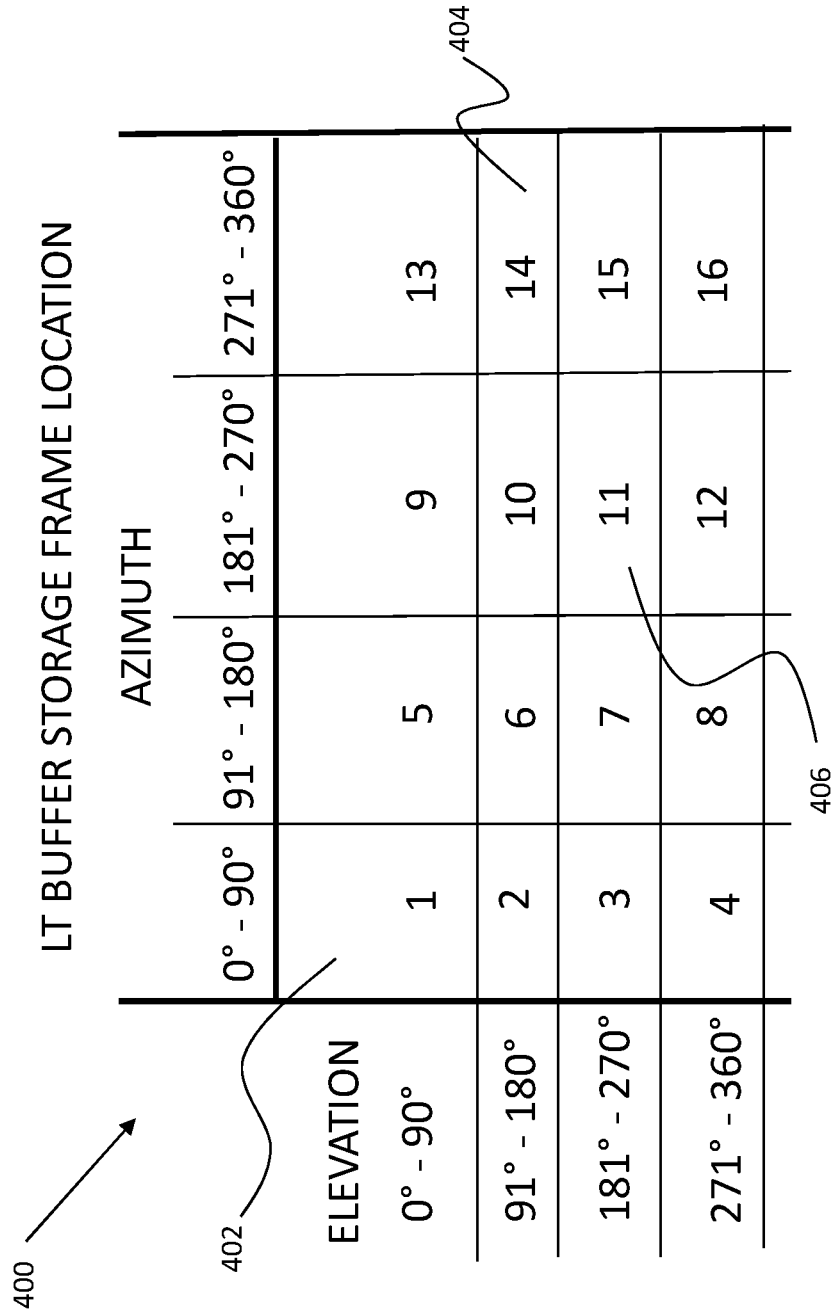
FIG. 4 is an exemplary layout of a LT buffer which may hold up to N reference frames, according to an embodiment of the present invention.

Allocation of the storage location of the reference frames may be as shown in FIG. 4, which is an exemplary layout of a LT buffer 400 which may hold up to N reference frames, according to an embodiment of the present invention. LT buffer 400 may be divided into N=16 frame storage locations, each location associated with the elevation and azimuth coordinates of a viewing area associated with the FOV of the image acquisition device, the summation of viewing areas substantially covering the spherical viewing area. In this example, it is assumed that the FOV of the image acquisition device may be defined by an elevation of 90° and an azimuth of 90° so that 16 viewing areas will substantially cover the spherical viewing area. Nevertheless, the skilled person may readily appreciate that the FOV may be defined by other elevation and azimuth coordinates, for example, the elevation may be 90° and the azimuth 120°, in which case the number of viewing areas required to cover the spherical viewing area will be less (i.e. 12 viewing areas), or 120°×180° in which case 6 storage locations may be required.

In other cases, the total of N frames may not be sufficient to cover the whole spherical viewing area. In this case, the LT buffer manager will seek to cover as much as possible from the spherical viewing area, under the restrictions of only N frames.

Allocation of reference frames in LT buffer 400 may be based on their azimuth and elevation coordinates. The horizontal lines represent the elevation and the vertical lines represent the azimuth. Each cell represents a storage location in LT buffer 400 for a reference frame, for example, cell 402 is the location for a reference frame whose coordinates include elevation between 0°-90° and azimuth between 0°-90°, cell 404 is the location for a reference frame whose coordinates include elevation between 81°-180° and azimuth between 271°-360°, and cell 406 is the location for a reference frame whose coordinates include elevation between 181°-270° and azimuth between 181°-270°.

Reference is now made to FIG. 5 which schematically illustrates an encoder 500 which may use long term prediction to encode video, according to an embodiment of the present invention. The encoder 500 may include an Inter-frame Prediction and Motion Estimation (IPME) module 502 including a LT buffer 504 and a ST buffer 506, a buffer manager 508, a motion detector module 510, and an optional graphics processing unit (GPU).

IPME module 502 may receive video frames from a video source and may store the frames in LT buffer 504 and in ST buffer 506 responsive to location instructions received from buffer 508. IPME module 502 may additionally use elevation and azimuth information from motion detector 510 to select reference frames from LT buffer 504 of ST buffer 506 to perform inter-frame prediction and to generate motion vectors and error prediction values. The motion vectors and error prediction values may then be sent to a decoder (see FIG. 6).

Buffer manager 508 may extract for each video frame the elevation and azimuth coordinates from Sensors 510 to determine which one or more viewing areas are included in the frame and to determine whether the frame contains new information not included in reference frames already stored in LT buffer 504. Based on the extracted information, buffer manager may send the frame to LT buffer 504 for example if it includes new information or to the ST buffer 506 for example if it does not contain new information. If the frame contains new information, buffer manager 508 may store the frame in LT buffer 504 as a buffer frame. LT buffer 504 may be arranged with storage locations as previously described for LT buffer 400.

Sensors 510 may include sensors to determine the elevation and azimuth coordinates of the FOV of the image acquisition device within the spherical viewing area for every frame. The sensors may include accelerometers, digital compass, and gyroscopes, among other types of sensors which may alone or in combination provide the elevation and altitude coordinates. GPU 512 may be any suitable processing unit including the same processor that generates the Video. Is such a case, the GPU has knowledge on many aspects of the present, past and future scenes, (including information about elevation and azimuth) and can use this information to guide the bugger manager 508 it its selections of frames to store in LT buffer 508.

Reference is now made to FIG. 6 which schematically illustrates an exemplary video compression system 600 using long term inter-frame prediction for 3D video, according to an embodiment of the present invention. Video compression system 600 may include encoder 500 (see FIG. 5) and a decoder 610 suitable to decode the information sent by encoder 500, which may include motion vectors and prediction errors. Following is a description of an exemplary operation of video compression system 600 which is described also with reference to FIG. 3. For clarity purposes, the operation is described with reference to a 7 frame decoder with a LT buffer size of 6 frames and a ST buffer size of 1 frame, although the skilled person may clearly appreciate that system operation may include encoders/decoders with greater or lesser buffer sizes.

a. Encoder 500 first instructs decoder 610 to allocate 1 frame in the memory buffer to the ST buffer and 6 frames to the LT buffer;

b. In frame 1 encoder 500 instructs decoder 610 to store the decoded version of frame 1 in the LT buffer;

c. In frames 2-874, encoder 500 instructs decoder 610 to store each decoded frames in the ST buffer, each time replacing the frame with a new frame (stores the last frame 874);

d. In frame 875, encoder 500 determines that the new frame reveals a substantial new viewing angle relative to frame 1, and instructs decoder 610 to store the decoded version of this frame in the LT buffer, in addition to frame 1;

e. In frames 876-1086, encoder 500 instructs decoder 610 to store each frame in the ST buffer, each time replacing the frame with a new frame (stores the last frame 1086);

f. In frame 1087, encoder 500 determines that the new frame reveals a substantial new viewing angle relative to frames 1 and 875, and instructs decoder 610 to store the decoded version of this frame in the LT buffer, in addition to frames 1 and 875;

g. And so on the operation is repeated until all the frames have been decoded.

Some embodiments include a long-term reference prediction video compression method, which comprises: dividing a viewing area into a plurality of viewing sections; measuring an elevation and an azimuth of a field of view (fov) in one or more of said viewing sections; and determining a storage location of a video frame associated with said field of view based on said measured elevation and azimuth. In some embodiments, wherein said storage location comprises one of a long-term buffer and a short-term buffer.

In some embodiments, the method further comprises: storing in said long-term buffer video frames associated with fov's substantially covering the largest possible part of the viewing area.

In some embodiments, the method further comprises: selecting a reference frame for inter-frame coding from one of said long-term buffer and said short-term buffer based on said azimuth and elevation of said field of view.

In some embodiments, the method further comprises: alternatively determining, based on information received from a GPU, to store said video frame in said long-term buffer.

Some embodiments include a long-term reference prediction video compression encoding system, which comprises: a long-term frame buffer for storing video frames; a detector to measure an elevation and an azimuth of a field of view associated with a video frame; and a buffer manager to determine, based on said measured elevation and azimuth, to store data associated with said video frame in said long-term frame buffer.

In some embodiments, the system further comprises: a short-term buffer for storing frames.

In some embodiments, the system further comprises: a motion estimator to select a reference frame from one of said long-term buffer and said short-term buffer, based on the azimuth and elevation of said field of view.

In some embodiments, said detector comprises an accelerometer and/or an image processor.

In some embodiments, the system further comprises: a GPU to generate the video frames and additional information.

In some embodiments, said buffer manager alternatively determines, based on said additional information received from said GPU, to store data associated with said frame in said long-term buffer.

In some embodiments, said additional information includes any one of azimuth, elevation, and scene elements.

Some embodiments include a long-term reference prediction video compression system, which comprises: a buffer for storing long-term video frames; a GPU; and a buffer manager to determine, based on information received from said GPU, to store data associated with a video frame in said long-term buffer.

In some embodiments, said information includes any one of an elevation and an azimuth of a field of view associated with a video frame, and scene elements.

In some embodiments, the system further comprises: a buffer for storing short-term frames.

In some embodiments, the system comprises: a motion estimator to select a reference frame from one of said long-term buffer and said short-term buffer based on the azimuth and elevation of said field of view.

Some embodiments provide a method for long-term reference prediction video compression, which includes: dividing a viewing area into a plurality of viewing sections; measuring an elevation and an azimuth of a field of view (fov) in one or more of the viewing sections; determining a storage location of a video frame associated with the field of view based on the measured elevation and azimuth.

Some embodiments provide a long-term reference prediction video compression encoder, which includes: a buffer for storing long-term video frames; a detector to measure an elevation and an azimuth of a field of view associated with a video frame; a buffer manager to determine, based on the measured elevation and azimuth, to store data associated with the video frame in the long-term frame buffer.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A video compression method for an Augmented Reality (AR) or Virtual Reality (VR) image acquisition apparatus, the method comprising:
   (a) dividing a viewing area, that is spherical and that includes an entirety of a spherical surrounding of a central point at which said image acquisition apparatus is located, into N rectangular and non-overlapping viewing sections that cover together an entirety of said spherical surrounding of said viewing apparatus, wherein N is a pre-defined positive integer;
      wherein said image acquisition apparatus comprises a fixed-size Long Term Buffer storage area and also a fixed-size Short Term Buffer storage area;
   (b) dividing the Long Term Buffer storage area of the image acquisition apparatus, into a plurality of sub-sections; wherein each sub-section of the Long Term Buffer storage area corresponds at least partially to a different viewing section of said N rectangular and non-overlapping viewing sections of said spherical surrounding of said viewing apparatus;
   (c) storing a different Long Term Reference Frame, in each of said sub-sections of the Long Term Buffer storage area, wherein each Long Term Reference Frame includes a field-of-view that corresponds, at least partially, to one of said N viewing sections,
      by storing in said Long Term Buffer storage area, video frames that cumulatively cover a largest possible part of the entirety of said spherical viewing area;
   (d) when a user of said image acquisition apparatus looks towards a particular spatial direction, determining an elevation and an azimuth of a particular current field-of-view of said image acquisition apparatus, and selecting one of said viewing sections that corresponds to said particular current field-of-view; and generating a determination indicating whether a currently-acquired frame contains new information that is not included in the Long Term Reference Frames that are already stored in the Long Term Buffer storage area;
   (e1) if said determination is positive, then: storing the currently-acquired frame as a Long Term Reference Frame in a particular sub-section of the Long Term Buffer storage area, based on the azimuth and elevation determined in step (d);
   (e2) if said determination is negative, then: storing said new information in the Short Term Buffer storage area;
      wherein the method determines whether to store data of a currently-acquired frame, either in the Long Term Buffer storage area or in the Short Term Buffer storage area, based on (I) the azimuth and elevation that were determined in step (d) and based on (II) differences between the currently-acquired frame and a Long Term Prediction Frame that corresponds to said azimuth and elevation.

2. The method according to claim 1, further comprising:
selecting a reference frame for inter-frame coding, from one of said Long Term Buffer storage area and said Short Term Buffer storage area, based on said azimuth and elevation of a field-of-view of a currently-acquired frame.

3. The method according to claim 1,
wherein said image acquisition apparatus comprises one or more sensors configured to sense the azimuth and the elevation that are associated with a current field-of-view to which said image acquisition apparatus is currently directed;
wherein the method is performed by a video encoder unit of said image acquisition apparatus;
wherein the video encoder unit of said image acquisition apparatus is configured to perform the method, and to store data of a video frame either in the Long Term Buffer storage area or in the Short Term Buffer storage area, by taking into account the azimuth and the elevation of the field-of-view as sensed by said one or more sensors of said image acquisition apparatus.

4. The method according to claim 1,
wherein said image acquisition apparatus comprises an image processing unit, configured to determine via image processing the azimuth and the elevation that are associated with a current field-of-view to which said image acquisition apparatus is currently directed;
wherein the method is performed by a video encoder unit of said image acquisition apparatus;
wherein the video encoder unit of said image acquisition apparatus is configured to perform the method, and to store data of a video frame either in the Long Term Buffer storage area or in the Short Term Buffer storage area, by taking into account the azimuth and the elevation of the field-of-view as determined by said image processing unit of said image acquisition apparatus.

5. The method according to claim 1,
wherein said image acquisition apparatus further comprises a Graphics Processing Units (GPU);
wherein the method comprises:
for encoding of a particular video frame,
analyzing, by said GPU of the image acquisition apparatus, information pertaining to
   (i) azimuth and elevation of at least one past scene acquired by the image acquisition apparatus, and
   (ii) azimuth and elevation of at least one subsequent scene acquired by the image acquisition apparatus, and
   (iii) azimuth and elevation of a current scene acquired by the image acquisition apparatus;
generating, by the GPU of the image acquisition apparatus, instructions indicating whether or not to store said particular video frame in the Long Term Buffer storage area.

6. The method according to claim 1,
wherein the method is implemented by said image acquisition apparatus which comprises at least: a processor, a memory unit, a wireless transceiver, and a touch-screen.

7. An image acquisition apparatus for Augmented Reality (AR) or Virtual Reality (VR) image acquisition,
the image acquisition apparatus comprising:
one or more processors configured to execute code;
one or more memory units;
a Long Term Buffer storage area;
a Short Term Buffer storage area;
wherein the one or more processors are configured to perform:
(a) dividing a viewing area, that is spherical and that includes an entirety of a spherical surrounding of a central point at which said image acquisition apparatus is located, into N rectangular and non-overlapping viewing sections that cover together an entirety of said spherical surrounding of said viewing apparatus, wherein N is a pre-defined positive integer;
wherein said image acquisition apparatus comprises a fixed-size Long Term Buffer storage area and also a fixed-size Short Term Buffer storage area;
(b) dividing the Long Term Buffer storage area of the image acquisition apparatus, into a plurality of sub-sections; wherein each sub-section of the Long Term Buffer storage area corresponds at least partially to a different viewing section of said N rectangular and non-overlapping viewing sections of said spherical surrounding of said viewing apparatus;
(c) storing a different Long Term Reference Frame, in each of said sub-sections of the Long Term Buffer storage area, wherein each Long Term Reference Frame includes a field-of-view that corresponds, at least partially, to one of said N viewing sections,
by storing in said Long Term Buffer storage area, video frames that cumulatively cover a largest possible part of the entirety of said spherical viewing area;
(d) when a user of said image acquisition apparatus looks towards a particular spatial direction, determining an elevation and an azimuth of a particular current field-of-view of said image acquisition apparatus, and selecting one of said viewing sections that corresponds to said particular current field-of-view; and generating a determination indicating whether a currently-acquired frame contains new information that is not included in the Long Term Reference Frames that are already stored in the Long Term Buffer storage area;
(e1) if said determination is positive, then: storing the currently-acquired frame as a Long Term Reference Frame in a particular sub-section of the Long Term Buffer storage area, based on the azimuth and elevation determined in step (d);
(e2) if said determination is negative, then: storing said new information in the Short Term Buffer storage area;
wherein the one or more processors are configured to determine whether to store data of a currently-acquired frame, either in the Long Term Buffer storage area or in the Short Term Buffer storage area, based on (I) the azimuth and elevation that were determined in step (d) and based on (II) differences between the currently-acquired frame and a Long Term Prediction Frame that corresponds to said azimuth and elevation.

8. The image acquisition apparatus according to claim 7,
wherein the one or more processors are configured to perform:
selecting a reference frame for inter-frame coding, from one of said Long Term Buffer storage area and said Short Term Buffer storage area, based on said azimuth and elevation of a field-of-view of a currently-acquired frame.

9. The image acquisition apparatus according to claim 7,
wherein said image acquisition apparatus comprises one or more sensors configured to sense the azimuth and the elevation that are associated with a current field-of-view to which said image acquisition apparatus is currently directed;
wherein said one or more processors are configured to store data of a video frame either in the Long Term Buffer storage area or in the Short Term Buffer storage area, by taking into account the azimuth and the elevation of the field-of-view as sensed by said one or more sensors of said image acquisition apparatus.

10. The image acquisition apparatus according to claim 7,
wherein said image acquisition apparatus comprises an image processing unit, configured to determine via image processing the azimuth and the elevation that are associated with a current field-of-view to which said image acquisition apparatus is currently directed;
wherein said one or more processors are configured to store data of a video frame either in the Long Term Buffer storage area or in the Short Term Buffer storage area, by taking into account the azimuth and the elevation of the field-of-view as determined by said image processing unit of said image acquisition apparatus.

11. The image acquisition apparatus according to claim 7,
wherein said image acquisition apparatus comprises a Graphics Processing Units (GPU);
wherein the one or more processors are further configured to perform:
for encoding of a particular video frame,
analyzing, by said GPU of the image acquisition apparatus, information pertaining to
(i) azimuth and elevation of at least one past scene acquired by the image acquisition apparatus, and
(ii) azimuth and elevation of at least one subsequent scene acquired by the image acquisition apparatus, and
(iii) azimuth and elevation of a current scene acquired by the image acquisition apparatus;
generating, by the GPU of the image acquisition apparatus, instructions indicating whether or not to store said particular video frame in the Long Term Buffer storage area.

12. The image acquisition apparatus according to claim 7,
wherein the image acquisition apparatus further comprises a wireless transceiver and a touch-screen.

* * * * *